Fig-4

United States Patent Office 3,422,593
Patented Jan. 21, 1969

3,422,593
METHOD OF AND APPARATUS FOR LOADING FRUITS OR OTHER ARTICLES ONTO FLAT TRAYS
Alfred W. Gerrans, San Jose, Calif., assignor to Sunsweet Dryers, San Jose, Calif., a corporation of California
Filed Aug. 30, 1965, Ser. No. 483,502
U.S. Cl. 53—35    31 Claims
Int. Cl. B65b 1/06, 3/06, 5/06

ABSTRACT OF THE DISCLOSURE

Method and apparatus for loading prunes or other fruits or articles, simultaneously onto a plurality of stacked trays which includes delivering the prunes from a single hopper through a plurality of superposed delivery chutes to the edges of the trays and then vibrating the trays so that the prunes are distributed thereacross into a single compact layer on each tray.

---

The present invention relates generally to the art of article handling and, more particularly, to a method of and apparatus for loading fruit or other articles onto flat trays.

In the processing of prunes and other fruits, to which processing the present invention is principally, though not exclusively, directed, and to which the following description will be specifically related by way of example, the green fruits (e.g. prune plums) are placed on flat trays in a single layer for subsequent traversal of a dehydration unit, usually in the form of a tunnel-like structure, wherefrom the product emerges as dried fruit (prunes). Conventionally, each fruit-supporting tray includes a flat surface on which the single layer of fruit is placed, and, in addition, three or more raised ribs which function both to strengthen the individual tray and to permit stacking of the trays in a fashion which permits simultaneous exposure of multiple layers of prunes on the stacked trays to the hot air wherefore the requisite high rate of dehydration can be achieved.

Although extremely efficient dehydration units are available, difficulties have been experienced in supplying loaded stacks of trays to the dehydrators at a rate sufficient to effect full realization of dehydrator capacity. More particularly, it has been conventional practice, and considered essential until the time of the present invention, to load the trays with prunes or other fruits in individual succession and thereafter effect a stacking of the trays for traversal of the dehydration unit. Subsequent to such traversal, it has been again necessary to break down the stack of trays into a successive series of individual trays from which the prunes could be conveniently removed. Even through the use of extremely efficient tray loading and stacking mechanisms, such as disclosed in my prior Patent No. 3,107,800, a minimum cycle time of ninety seconds was requisite for loading and stacking a group of twenty-six trays onto a cart for traversal of a dehydration unit and for subsequently breaking down the stack and unloading the dried fruits therefrom. It will be obvious from a cursory appraisal of the structure described in the aforementioned patent that not only did the ninety-second cycle present a practical problem, but a complex and expensive apparatus was requisite for the attainment of even this time-restricted loading cycle.

Accordingly, it is a general object of the present invention to provide a method of and apparatus for loading fruits or other articles on flat trays in an expeditious fashion.

More particularly, it is a feature of the invention to provide a method of and apparatus for loading fruits or the like onto flat trays while such trays are in stacked relationship.

A related feature of the invention is the provision of a method and apparatus for loading fruit onto a stack of trays wherein such stack can consist of a plurality of individual trays resting one upon another or, alternatively, a unitary structure providing a plurality of spaced fruit-supporting platforms.

It is another feature of the invention to provide a tray structure designed to expedite the loading method although conventional trays can be utilized.

It is an additional feature of the invention to provide for vibration of one or more trays in a fashion so that prunes or other articles delivered to one edge of an individual tray will be simultaneously distributed in substantially a single layer thereover.

Another feature of the invention relates to the metered delivery of prunes or other articles onto the individual trays of a stack to assure placement of a full complement of prunes in a single layer on each individual tray.

More particularly, it is a feature of the invention to provide for a prune-metering arrangement which can be adjusted dependent upon the size of the prunes or other articles to assure delivery of the requisite metered amount of the articles to the individual trays.

Additionally, it is a feature of the invention to provide for delivery of prunes or other articles simultaneously to the trays in a stack adjacent one edge thereof for subsequent movement thereacross into a single layer on each tray together with an arrangement for precluding inadvertent emergence of the articles from the remote edge of each tray.

Yet more specifically, it is a feature of the invention to provide for vibratory motion of the entire tray stack (unitary or separable) whereby the single layer distribution of fruits or other articles onto the trays will be effected simultaneously, and therefore expeditiously.

Additionally, in accordance with the general objective of expediting the loading of fruits or other articles onto individual trays of a stack, it constitutes a feature of the invention to provide for delivery of an empty stack of trays from an entrance station to the loading station simultaneously with the delivery of a loaded stack of trays from a loading station to an exit station.

Specifically, it is a feature of the invention to provide for movement of the fruits or other articles across the trays into a single layer disposition thereon by means of a vibratory support of all of the trays together with a tray-conveying cart upon which the stack of trays is supported to thus obviate the necessity of removal of the stack from its cart.

A related feature of the invention is to provide for vibratory support of the cart and a stack of trays thereon by multiple eccentric actuation of a plurality of pivoted stack-suspending arms.

A correlated feature of the invention is the provision for relative, rotative adjustment of the eccentric actuators to assure substantially identical motion of the pivoted points of suspension.

It is another feature of the invention to provide an effective arrangement for supporting a stack of trays for vibratory motion adjacent the exit ends of a plurality of fruit-delivery channels preferably in the form of angularly disposed delivery chutes pivotally supported at their upper ends and arranged for engagement with the edges of the fruit-supporting trays at their lower ends so that effective transfer of fruits onto the trays from the chutes is afforded.

More particularly, it is a feature to arrange the terminal portions of the chutes and/or the associated trays so as to preclude "bridging" of the fruits during their transfer.

A related feature of the invention is the provision for pivotal motion of such delivery chutes during clamping action of the associated trays to facilitate entrance of the terminal ends of the chutes between respectively associated trays.

Additionally, it is a feature of the invention to provide for a simple gate mechanism in the fruit-delivery chutes which is movable between an adjusted, closed disposition for retaining a metered amount of fruits in each chute and an opened disposition for subsequently releasing the metered amount of fruits for delivery onto each of the associated fruit-supporting trays.

It is another feature of the invention to provide for vibratory motion of at least one segment of each fruit delivery chute to initiate the flow of fruits through the chute and onto the associated fruit-supporting tray.

Another feature of the invention is the provision of a hopper arranged to hold a mass of prunes or other articles for controlled delivery into the individual tray-feeding chutes.

Additionally, it is a feature to provide a hopper which can effectively deliver fruits simultaneously to several individual chutes.

More particularly, it is a feature of the invention to provide a hopper arranged for movement adjacent to the entrance ends of the tray-feeding chutes whereby fruits or other articles are sequentially delivered from the moving hopper into the multiplicity of chutes.

More particularly, it is a feature of the invention to provide a hopper which incorporates a dual gate mechanism which facilitates the controlled dispensing or delivery of fruits or other articles from a large mass into individual feed chutes.

Additionally, it is a feature of the invention to provide a hopper arranged for movement adjacent the entrance ends of a plurality of chutes, and incorporating a gate mechanism which automatically opens as traversal of such feed chutes is instigated and automatically closes upon completion of such traversal.

Another particularly significant feature of the invention is the provision for delivery of fruits or other articles from the hopper into the entrance ends of the multiplicity of feed chutes contemporaneously with the positioning of a stack of fruit-supporting trays in a fruit-receiving position adjacent the exit ends of those same chutes, thereby expediting the entire operation.

These as well as other objects and features of the invention will become more apparent from a perusal of the immediately following description of the method of the present invention and the subsequent description of an apparatus exemplifying the manner in which the method can be carried out in practice.

Generally, the method involves the following steps. Initially, one or more fruit-supporting trays are brought sequentially to a loading station adjacent the exit ends of a corresponding number of fruit delivery channels through which the fruits can be conveyed onto the trays. Upon arrival at such loading station, the second step of the method involves the grasping and subsequent vibrating of the tray or trays in a fashion such that fruits delivered to one edge of the trays will be gradually spread thereacross in a single layer on each of the trays. In order to expedite the flow of fruits or other articles through the delivery channels, a preferred third step of the invention involves imparting vibration to the fruits as the delivery channels are traversed thereby.

An additional step of the method involves the feeding of fruits or other articles from a large hopper into the individual delivery channels associated with the respective trays which receive the fruits. Preferably, such fruit-feeding occurs simultaneously with the placement of a tray or stack of trays in fruit-receiving position and control means are provided for precluding delivery of fruits or other articles from the channels onto the trays until the latter are in receiving position.

Additionally, a preferred control step involves metering the fruits or other articles from the delivery channels onto the individual trays so that a compact single layer of fruits will be delivered to each tray.

The detailed steps of the method will become more apparent from the subsequent description of an exemplary apparatus and its operation, reference being made to the accompanying drawings wherein:

Figures 1, 1A, 1B, 2:
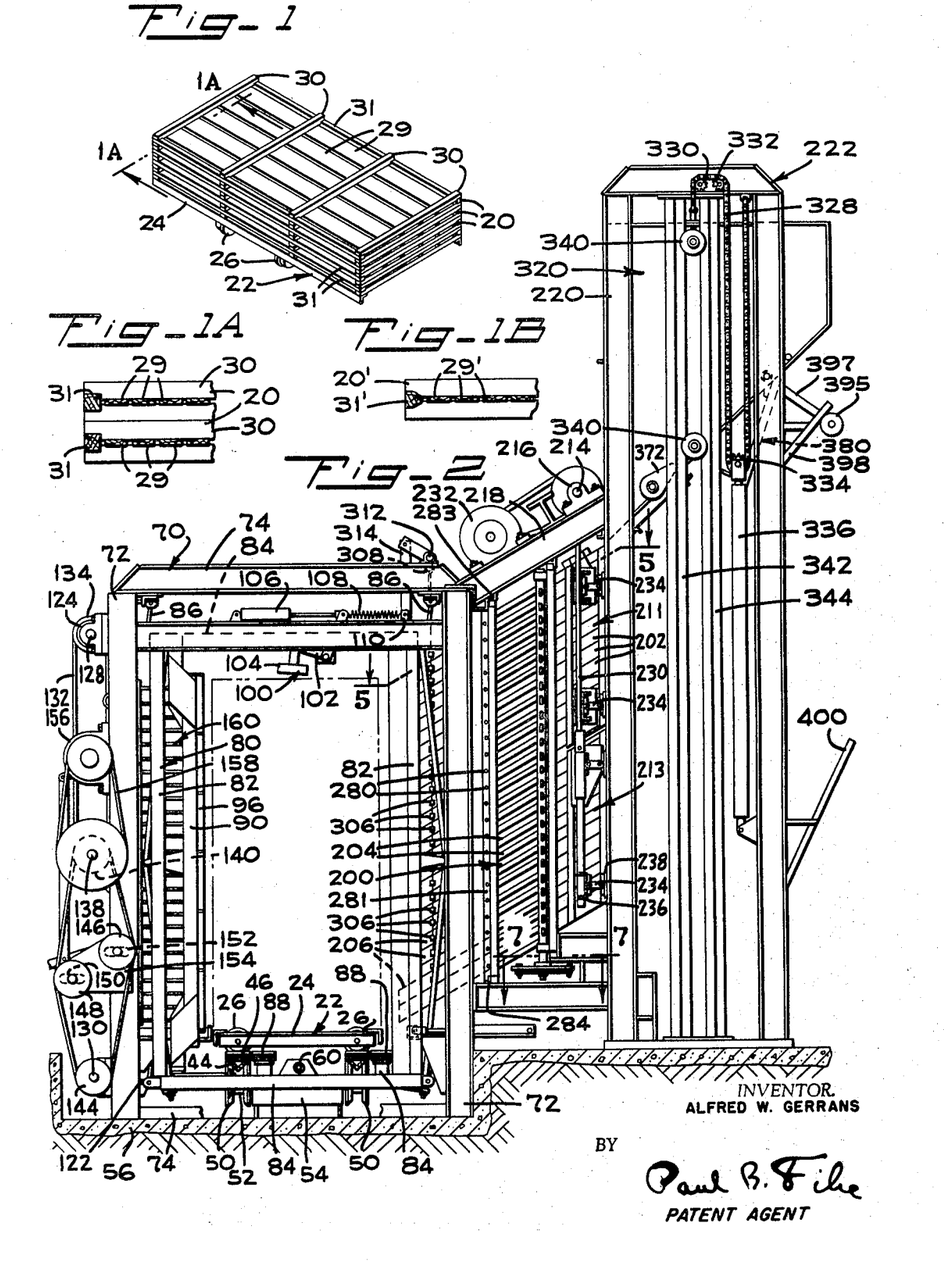
FIG. 1 is a fragmentary perspective view of a group of conventional fruit-supporting trays positioned on a suitable tray stack conveyer in the form of a cart in preparation for the loading of fruits in accordance with the present invention.
FIG. 1A is an enlarged fragmentary sectional view taken along line 1A—1A of FIG. 1, illustrating structural details of the trays.
FIG. 1B is a fragmentary sectional view similar to FIG. 1A illustrating a novel tray configuration embodying one feature of the present invention.
FIG. 2 is an end elevational view of an apparatus for loading fruits onto individual trays of a stack as illustrated in FIG. 1.

For presentation to the apparatus, the trays 20 are stacked conventionally, as shown in FIGS. 1 and 2, upon a flat cart 22 consisting of a rectangular frame 24 of appropriate dimensions supported on four small wheels 26. Normally, twenty six of the trays 20 are stacked on a single cart 22, each tray consisting of a large number of thin fruit-supporting slats 29 that are held in slightly spaced co-planar relation by four relatively thick parallel ribs 30 which are suitably secured to the slats 29, both at intermediate positions and at the respective ends thereof, thus to divide the trays into 3 fruit-supporting sections. As will be apparent from an inspection of FIG. 1, these thick ribs 30, come into engagement when trays are properly stacked and leave sufficient space between the fruit-supporting slats 29 to enable the accommodation of a layer of fruits thereon and passage of warm air thereover when a stack is passed through a dehydrator. Additionally, to confine the layer of fruits to the slats 29, other relatively thin ribs 31, are secured to the ends of the described supporting ribs 30 so that in effect, a low wall is formed about the entire periphery of the tray 20. Conventionally, these latter ribs 31 are relatively thin and of rectangular cross-section so that a vertical distance of approximately two inches exists therebetween when the trays are stacked, as best shown in FIG. 1A. This space at one edge of the stacked tray 20 provides an entrance for the delivery of fruits onto the trays in accordance with the present invention.

The described type of tray 20 is that conventionally employed in the fruit handling industry and the embodiment of the invention herein disclosed has been specifically designed for this industry and therefore to handle this type of tray and the fruits carried thereby. However, as will be apparent from the following description, the principles of the invention can be embodied in other structures of a slightly modified nature so that not only can a stack of trays be loaded with fruits in accordance with the present invention, but, for example, a unitary box-like structure having a plurality of platforms in vertically-spaced relation can also be utilized. Furthermore, the precise structural arrangement of the stacked trays, or the platforms of a unitary structure can obviously be varied in many aspects yet be loaded in accordance with the general method of the present invention, and more particularly with but slight modification of the apparatus hereinafter to be described in detail.

By way of example, the slightly modified tray 20' shown in FIG. 1B simplifies the tray loading operation. Each tray 20' includes fruit-supporting slats 29' substantially identical with those shown in FIGS. 1 and 1A. However, the thin ribs 31' are not rectangular in cross-section but are tapered inwardly from the edge of the tray 20' to facilitate entrance of fruits onto the tray, as will be explained in detail hereinafter.

Figure 3:
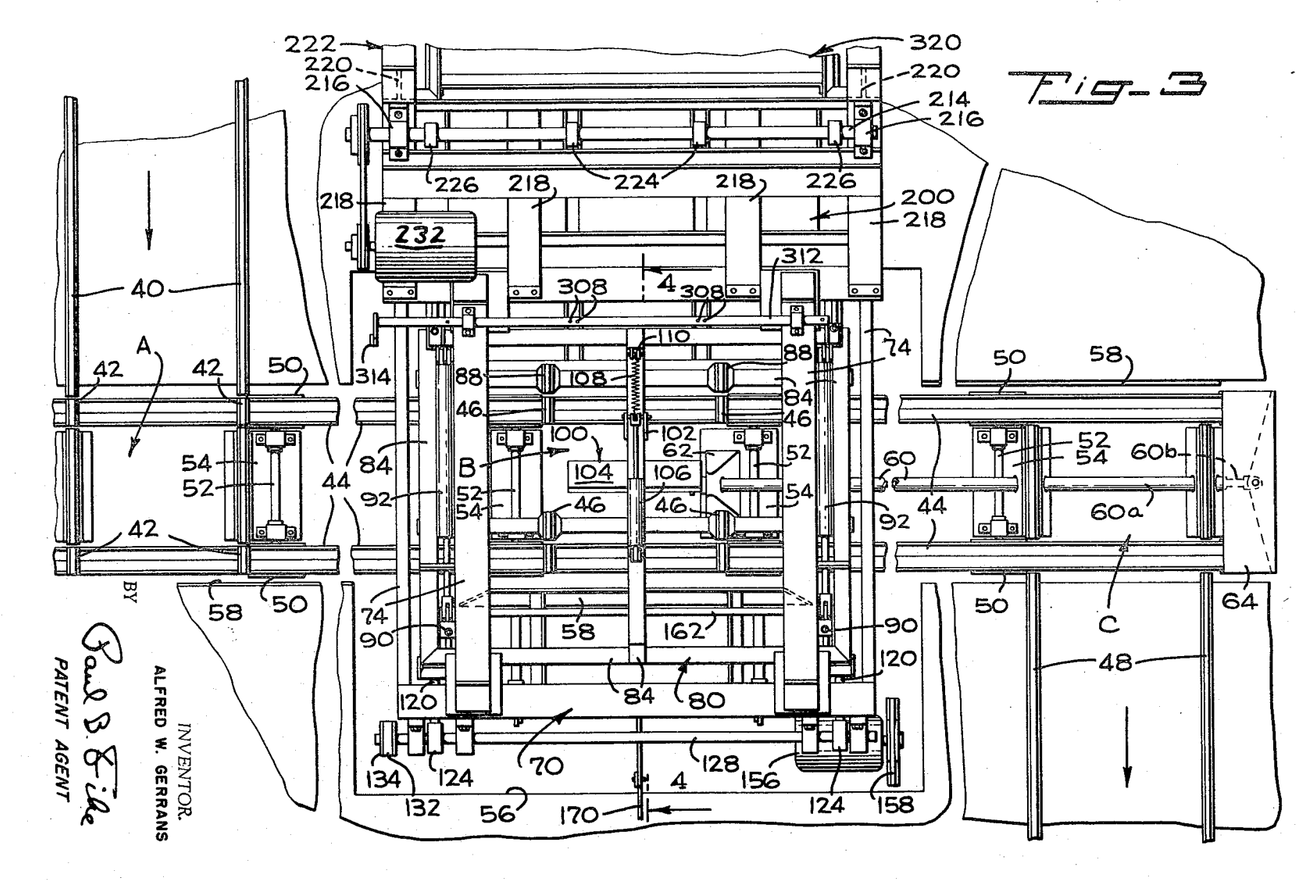
FIG. 3 is a fragmentary top plan view of a portion of the structure illustrated in FIG. 2 and particularly showing the track layout wherein the stacked trays are brought on the cart shown in FIG. 1 from an entrance station to a loading station and subsequently to an exit station, portions of the apparatus at the loading station being illustrated.

A plurality of carts 22, each with an empty stack of trays 20 or 20' thereon, are supported for successive movement along a fixed track 40 to an entrance station, indicated at A in FIG. 3. The fixed track 40 is interrupted at the entrance station A to allow the interposition of a set of four transversely-shiftable stub track sections 42 into alignment therewith, the disposition of the stub track sections being equivalent to the spaced disposition of the four wheels 26 of an individual cart so that a cart 22 delivered to the entrance station A can be entirely supported on the shiftable stub sections for subsequent transverse movement towards the tray loading station, indicated at B.

Figure 4:
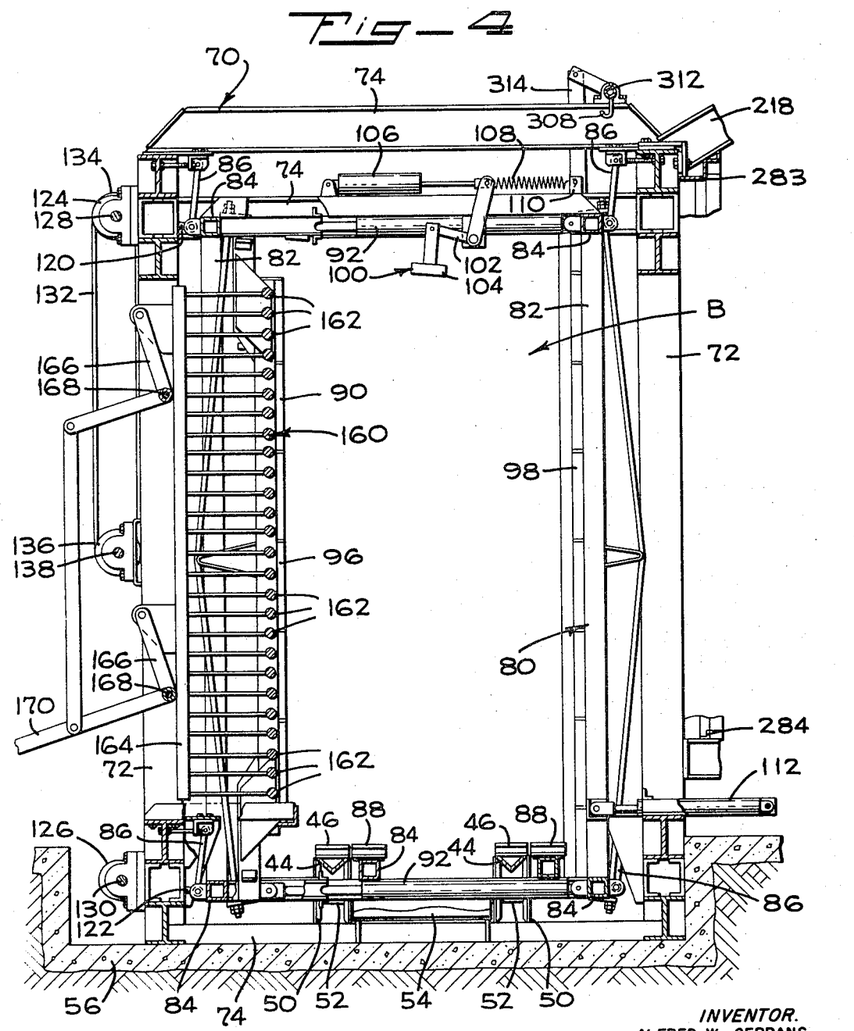
FIG. 4 is a transverse, vertical sectional view taken along line 4—4 of FIG. 3, illustrating additional details of the tray-loading apparatus at the tray-loading station.

With additional reference to FIGS. 2 and 4, the stub track sections 42 are mounted rigidly on the upper edges and adjacent one extremity of elongated parallel V-shaped channel members 44 which extend in rectangular relationship to the fixed cart track 40. At the remote extremity of the elongated channel members 44, a similar set of stub track sections 46 are secured thereto and are also arranged to support a single cart 22 thereon. The spacing between the two sets of stub track sections 42, 46 is equal to that between the mentioned entrance station A and the tray-loading station B and is also equivalent to the distance between such loading station B and an exit station C adjacent an interrupted fixed track 48 permitting the removal of loaded trays on a cart 22 from such exit station to a dehydrator or a temporary storage area.

The stub track-supporting channel members 44 are movably carried on a plurality of V-shaped rollers 50 supported at spaced intervals between the entrance and exit stations A and C on parallel, rotatable shafts 52 carried at the upper end of suitable brackets 54 fixed by secured to a concrete base 56, as best shown in FIGS. 2 and 4, which, as illustrated, is depressed from the surrounding ground level wherefore the supported stub track sections 42, 46 are at the same level as the entrance and exit tracks 40, 48. Preferably, fixed guide members 58 extend along the channel members 44 to preclude lateral displacement of a cart 22 from the stub tracks 42 or 46.

Movement of the stub tracks 42, 46 on the supporting channel members 44 is effected preferably by a hydraulic ram 60, the cylinder portion 60a of which is fixedly secured to a bracket 62 which is, in turn, secured on the depressed concrete base 56 in the vicinity of the central loading station B and between the elongated channel members so that the projecting movable piston portion 60b of the ram extends beyond the exit station C and is secured at its extremity to the center of a transverse brace 64 connected at its outer extremities to the channel members 44. When the hydraulic ram 60 is retracted, as illustrated in FIG. 3, the first set of stub track sections 42 are disposed at the entrance station A so that an empty stack of trays 20 and the supporting cart 22 can be received thereon while the second set of stub track sections 46 are disposed at the loading station B for support of a loaded stack of trays 20 on another cart 22. From such position, if the hydraulic ram 60 is extended, an empty cart 22 at the entrance station A will be moved to the loading station B while the loaded cart is simultaneously moved to the exit station C. When the latter position has been attained, the loaded stack of trays 20 on the cart at station C may be removed from the stub track section 46 along the exit track 48 and the empty stack of trays 20 on the cart at the loading station B can be simultaneously removed from the first set of stub track sections 42 preparatory to the reception of fruits at such loading station as will be explained hereinafter. The stub track sections 42 and 46, now being emptied of their respective carts, can be moved by appropriate retraction of the hydraulic ram 60 back to the position shown in FIG. 3 preparatory to reception, respectively, of an empty stack of trays at the entrance station A and reception of a loaded stack of trays on its cart at the loading station B. The entire loading operation, as will be apparent, is expedited by the movement of a loaded stack of trays 20 from the loading station B to the exit station C simultaneously with the movement of an empty stack of trays 20 from the entrance station A to the loading station B.

At such loading station B, a stack of trays 20 is generally encompassed by a stationary box-like frame 70 which consists of four upright frame members 72 which rest at their lower ends on the recessed concrete base 56 and are joined at both their upper and lower ends by rectangularly-related braces 74. Within the stationary frame 70, but still in encompassing relationship with a stack of trays 20 at the loading station B is a vibratory frame 80 that is also of generally box-like configuration consisting of four upright members 82 joined at their upper and lower extremities by rectangularly related braces 84. At the eight corners of the vibratory frame 80, it is suspended by like arms 86, each of which is pivotally connected at its lower end to a respective corner of the vibratory frame 80 and is similarly pivotally connected at its upper end to one corner of the stationary frame 70. The pivotal suspension is such that the vibratory frame 80 swings to and fro in a direction generally transverse to the path of movement to a stack of trays 20 from the entrance to the exit station, and as will become more apparent hereinafter, in a direction aligned with the flow of fruits or other articles across the trays during a loading operation.

The transverse braces 84 at the lower extremity of the vibratory frame 80 carry another set of four stub track sections 88 which are rigidly secured thereto adjacent one set of the stub track sections 42 or 46 when positioned at the loading station B. As a consequence, at such station, an entire cart 22 with the stack of trays 20 thereon can be moved from the shiftable stub tracks 42 onto the adjacent stub tracks 88 on the vibratory frame 80 so that, in effect, the entire stack of trays 20 and the supporting cart 22 is then carried by the vibratory frame 80.

Movement of the cart 22 and the stack of trays 20 thereon onto the stub tracks 88 of the vibratory frame 80 is accomplished by movement of a pair of clamping members 90, which extend substantially vertically and in parallel relationship at that side of the loading station B remote from the fruit-delivery mechanism to be described hereinafter or to the left as viewed in FIG. 4. Each clamping member 90 is slidably supported from the transverse members 84 of the vibratory frame 80 at its upper and lower extremities for shifting movement in transverse relationship to the path of tray stack travel from the entrance station A to the exit station C of the apparatus. Such shifting movement of the pair of clamping members 90 is hydraulically actuated by four hydraulic rams 92, two of which are connected to the top and bottom of one clamping member and the other two of which are similarly connected to the other clamping member. More particularly, each hydraulic ram 92 has the extremity of its piston portion connected to one end of one clamping member 90 and the remote end of its cylinder portion connected to the remote right side of the vibratory frame 80 as viewed in FIG. 4. The rams 92 are double acting, and when hydraulic pressure is applied in a conventional fashion to retract the rams, both clamping members 90 will be moved to the right from the position shown in FIG. 4 and alternatively, when hydraulic pressure is thereafter applied to the other end of the rams 92, the clamping members 90 will be moved to the left and returned to the position shown in FIG. 4.

Preferably, the elongated clamping members 90 are provided with a rubber covering 96 which cushions the engagement of the clamping members with the sides of the stacked trays 20 and the vertically extending members 82 of the vibratory frame 80 on the opposite side thereof are also provided with a rubber covering 98 so as to establish resilient engagement with the side of the tray stack engaged thereby.

When a cart 22 with an empty tray stack thereon is delivered to the loading station B, the retraction stroke of the four hydraulic rams 92 is approximately seven and one-half inches, which is sufficient to move the cart and the stack of trays thereon to the right from the position shown in FIG. 2 or FIG. 4 onto the stub tracks 88 mounted on the vibratory frame 80 and in compressed relation between the movable clamping members 90 and the fixed clamping members 82 of the vibratory frame 80 wherefor the cart 22 and stack of trays 20 is engaged on two sides and on the bottom.

Preferably, if a separable stack of trays 20 rests upon a cart 22, an additional clamping member 100 is employed to resiliently engage the top of the tray stack so that the top, bottom and two sides of the stack and the cart upon which it rests are firmly affixed to the vibratory frame 80. This top clamping member 100 can take the form of a pivoted lever 102 which carries at its lower extremity a tray-engaging cushion 104 and is secured at its remote extremity to the piston portion of a hydraulic ram 106 which, upon retraction, effects downward movement of the clamping member into engagement with the top of the stack and, when extended, raises the clamping member from such engagement. This hydraulic ram 106 is preferably connected in the same hydraulic circuit (not shown) with the previously described hydraulic rams 92, 94, but is provided with a delay means arranged to withhold clamping engagement with the top of the stack until it has been moved onto the vibratory frame and is effectively clamped on opposite sides by the previously described elongated clamping members 90, 82. Such delay means includes a spring 108 which is supported under tension between the end of the lever 102 where it connects to the hydraulic ram 106 and a bracket 110 on the vibratory frame 80. Accordingly, this spring 108 holds the clamping member 100 in its upper, in operative position until a predetermined hydraulic pressure has been applied to the ram 106 and the spring tension is adjusted so that no hydraulic actuation of the lever 102 takes place until the side clamping members 82, 90 have moved the cart and the stack of trays onto the vibratory frame 80. Thereafter, the lever 102 is pivoted by the hydraulic ram 106 to bring the clamping cushion 104 into engagement with the top of the tray stack. Similarly, when clamping engagement with the stack of trays is to be released, the spring 108 effects withdrawal of the clamping engagement with the top of the stack prior to release of the side clamping members 90, 82 and return of the cart 22 and the stack of trays 20 onto the movable stub track 42.

In order to effect such return movement of a loaded stack of trays 20 and the cart 22 on which it is supported from the vibratory frame 80, two additional hydraulic rams 112 are supported from the stationary frame 70 adjacent the lower end thereof for extended movement into pushing engagement with the lower portion of the stack to urge the same to the left as viewed in FIG. 4 and return the cart and stack of trays thereon onto the movable stub tracks 42. These two hydraulic rams 112 can conveniently be connected in the same hydraulic circuit (not shown) with the previously described hydraulic rams 92, 106 so that all the rams are actuated substantially simultaneously in a cooperative fashion.

After a stack of trays 20 has been brought into clamped engagement on the vibratory frame 80, vibratory motion is imparted to such frame, the cart 22 and the stack of trays 20 thereon in a manner which is adapted to spread fruits or other articles delivered to the edge of each tray thereacross in substantially a single layer. Preferably, the mechanism takes the form, as best shown in FIGS. 2 and 4, of four eccentrically-actuated arms 120, 122, two of which are connected to the lower ends of the vibratory frame suspending arms 86 at the upper left at the frame and two of which are similarly connected to the suspension points of the vibratory frame 80 at the lower left. The remote ends of the actuating arms 120, 122 are connected respectively to conventional eccentric mechanisms 124, 126 mounted in alignment on transverse horizontal shafts 128, 130 secured to the upper and lower transverse braces 74 of the stationary frame 70. The upper eccentric shaft 128 is driven by a timing belt 132 which encompasses a pulley 134 on the upper eccentric shaft and another pulley 136 on a horizontal drive shaft 138 supported from the frame 70 at an intermediate level, as most clearly shown in FIG. 4. At the remote end of the drive shaft 138, as best shown in FIG. 2, another pulley 140 is drivingly encompassed by a timing belt 142 which passes around a corresponding pulley 144 on the lower eccentric shaft 130 and also two intermediate idler pulleys 146, 148 supported for horizontal adjustment in slots 150, 152 on a mounting plate 154 secured to the stationary frame 70. If both of these idler pulleys 146, 148 are shifted to the right as viewed in FIG. 2, the rotary disposition of the lower eccentric shaft 130 will be shifted in a counterclockwise direction which will, in turn, provide for rotary adjustment of the eccentrics 126 thereon. On the other hand, if the two idler pulleys 146, 148 are shifted to the left as viewed in FIG. 2, a clockwise rotary adjustment of the lower eccentric shaft 130 will be effected. By appropriate manipulation of the two idler pulleys, 146, 148, the rotary disposition of the lower eccentrics 126 can be made to correspond exactly to the rotary disposition of the upper eccentrics 124 wherefor, all four actuating arms 120, 122 partake of like motion and the entire vibratory frame 80 partakes of identical vibratory motion.

A suitable drive motor 156 is connected by a belt and pulley arrangement indicated at 158 to the central drive shaft 138 and, upon actuation, effects rotation of such drive shaft and the eccentric shafts operatively connected thereto. Upon such actuation, the vibratory frame is moved by the eccentrics 124, 126 in a downward, arcuate motion from the position illustrated in FIGS. 2 and 4 to an extended position where the suspending arms 86 are substantially vertical and is thereafter returned along an arcuate upward path to the original position, such motion imparting movement of fruits, delivered to the right hand edge of the tray as viewed in FIG. 4, toward the left hand edge thereof. In practice, a total arcuate stroke of approximately three-eighths (⅜) inch and an eccentric shaft rotation of approximately five hundred 500 revolutions per minute has been found very effective in spreading the received fruits rapidly over the surface of the trays 20 in a single compact layer.

Since a point of egress exists at the remote edges of the stacked trays 20 and the described vibratory motion can actually expel fruit through such openings, flow-retarding means 160 is movably supported from the previously described stationary frame 70. More particularly, such flow-retarding means 160 consists of a plurality of individual stops 162 arranged for movement into blocking position adjacent the remote edge of the trays 20. The stops 162, as illustrated best in FIG. 4, take the form of ribs which are secured to a rigid rectangular frame 164 pivotally secured to the ends of levers 166 which are in turn pivotally mounted on two vertically spaced horizontal rods 168 mounted on the stationary frame 70. The remote ends of the pivoted levers 166 are connected to an actuating handle 170 which, as shown, can be moved manually, but obviously, if desired, could be hydraulically actuated at the same time that the hydraulic actuation of the clamping members takes place. Regardless of the precise manner of actuation, the individual stops 162 are moved in an upward arcuate path from the inoperative position shown in FIG. 4 to exit blocking position adjacent the edge of the stacked trays 20 to thus preclude flow of fruit through the exits.

While the entire stack of trays 20 is being vibrated in the fashion described, fruits or other articles are delivered thereto from a plurality of fruit delivery or feed chutes 200, three of which are disposed in side-by-side relation at each level corresponding to that of an individual tray so that fruits from the three chutes are delivered simultaneously to the three sections of the tray 20 between the described dividing ribs 30.

Three of the side-by-side chutes 200 at one level are illustrated in plan in FIG. 5, but since all of the chutes are of substantially identical nature, both structurally and functionally, only one chute will be described in detail.

Each feed chute 200 is longitudinally divided into three separate but cooperative segments 202, 204 and 206 extending in longitudinally aligned relationship from an upper entrance end whereat fruits are received from a hopped in a manner to be described in detail hereinafter to a lower exit end adjacent a respective one of the individual trays 20 on the described vibratory frame 80, the aligned segments of the feed chute being preferably disposed at an angle of approximately 30°. Generally, the initial segment 202 of each feed chute whereat the fruits are received constitutes a vibratory segment which functions to initiate flow of fruits through the feed chute, the intermediate segment 204 functions to control both the amount of fruit delivered onto a tray section and the time of such delivery, and the final discharge segment 206 provides a terminal portion that is cooperatively arranged with an adjacent tray to direct fruits or other articles onto the surface of that tray 20 adjacent one edge thereof.

More particularly, each vibratory chute segment 202 is formed from sheet metal or the like with a flat bottom and shallow side walls so as to be substantially U-shaped in cross section, the width of the chute segment being equivalent to the width of one fruit-supporting section of a tray 20. Laterally adjacent chute segments 202 are rigidly joined by channel members 210 whose transverse dimensions are substantially equivalent to the dividing ribs 30 of a fruit-supporting tray 20 so that the three side-by-side segments 202 are in proper aligned relationship with the three sections of a tray. The segment-joining channel members 210 extend vertically so as to rigidly connect the chute segments 202 in spaced superposed relationship at levels corresponding to the levels of the stacked trays 20 to which the fruits are to be delivered. Preferably, the thirteen uppermost feed chute segments 202 are connected by the channel members 210 to provide one unitary structure 211 which can be vibrated in a substantially vertical direction and the lowermost thirteen chute segments 202 are similarly connected by channel members into an integral unit 213 which also can be vibrated.

To effect the vibratory motion of both the upper and lower units 211, 213 of vibratory chute segments 202, a shaft 214 is positioned in bridging relationship above the vibratory chute segments as best shown in FIGS. 2 and 3, the shaft being supported at its extremities in suitable bearings 216 attached rigidly to stationary frame members 218 that are connected rigidly at one end to the previously described stationary frame 70 within which the stack of trays 20 and the cart are suspended and vertical frame members 220 forming part of a stationary frame 222 on which the mentioned fruit hopper is supported, as will be described in detail hereinafter. Four conventional eccentrics 224, 226 are mounted on the shaft 214, two adjacent its ends and two at intermediate positions, Suspension arms for the upper vibratory chute segment unit 211 are pivotally connected between the intermediate eccentrics 224 and the upper vibratory unit immediately thereunder so that upon rotation of the shaft, vertical reciprocation of the entire unit is effected. In turn elongated suspension arms 230 are connected to the outermost eccentrics 226 on the shaft and extend downwardly adjacent the outer side of the upper vibrator unit 211 for connection to the lower vibrator unit 213, wherefore rotation of the same shaft 214 also effects vertical reciprocation of the lower unit. Preferably, the eccentric mounting of the two units 211, 213 is rotatively opposed so that an out-of-phase reciprocation of the upper and lower vibratory chute units 211, 213 is achieved, the upper unit 211 moving up while the lower unit 213 is moving down. The vertical reciprocation imparted to each of the vibratory chute units 211, 213 is one-eight (⅛) inch and the eccentric shaft 214 is driven from a suitable motor 232 mounted on one of the described frame members 218 so that the eccentric shaft is driven at a rotative rate of nine hundred (900) revolutions per minute. Such vibratory action precludes bridging of the fruits between the superposed chute segments 202 and instigates a rapid downward movement thereof into the aligned intermediate flow-control segments 204 of the chutes. Preferably, each of the vibratory chute units 211, 213 is restricted to substantially vertical motion by short links 234 pivotally connected between a bracket 236 on the sides of the chute units and a neighboring bracket 238 connected to the mentioned vertical frame members 220 as best shown in FIGS. 2 and 5.

The intermediate flow-control segment 204 of each fruit-delivery chute 200 includes a simple flat pan that is rigidly connected at its opposite edges to vertically extending struts 240 secured at their upper ends to transverse frame members 242 and at their lower ends to similar transverse frame members 244.

Figure 5:
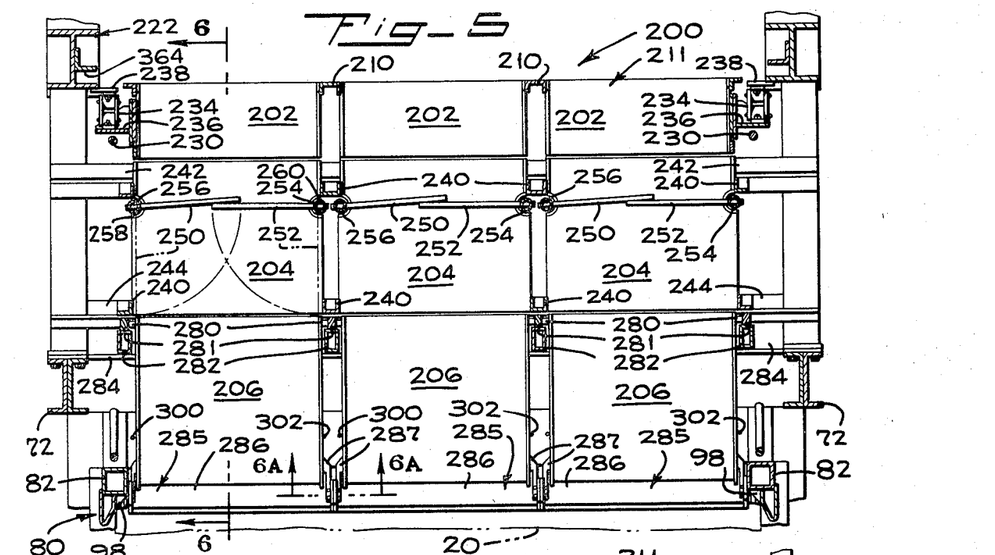
FIG. 5 is a fragmentary sectional view taken along line 5—5 of FIG. 2, and illustrating in plan the arrangement of segmented feed chutes which deliver fruits onto a stack of trays at the loading station.
Figures 6, 6A, 6B:
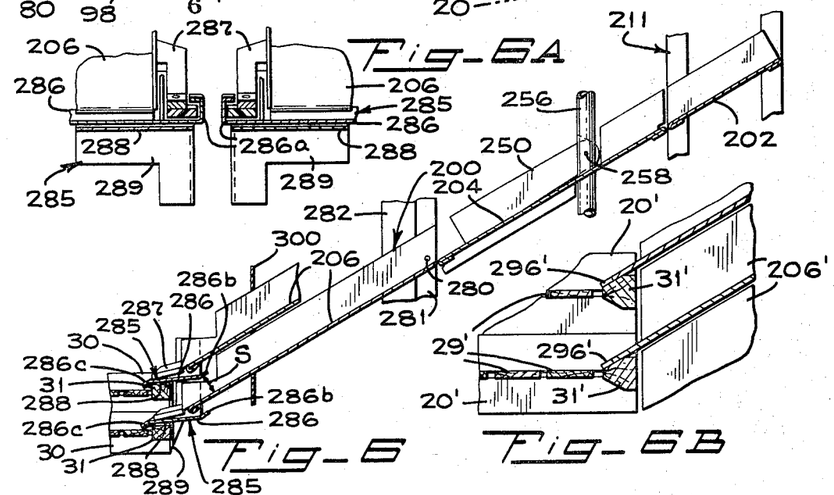
FIG. 6 is an enlarged fragmentary vertical sectional view taken along line 6—6 of FIG. 5, particularly showing the relationship of the feed chutes to the fruit-receiving trays of the type illustrated in FIGS. 1 and 1A.
FIG. 6A is an enlarged fragmentary sectional view taken along line 6A—6A of FIG. 5.
FIG. 6B is a fragmentary sectional view of a portion of the structure shown in FIG. 6 but illustrating modified feed chutes in relation to the modified type of tray as shown in FIG. 1B.

Adjacent the upper entrance ends of each pan, two cooperating gates 250, 252 are pivotally supported on vertical rotary shafts 254, 256 located on opposite sides thereof for movement between the closed full-line dispositions illustrated in FIG. 5 whereat the remote free ends of the gates overlap to preclude the flow of fruits or other articles through the chute segment 204 and opened dispositions shown in phantom lines in FIG. 5 and full lines in FIG. 6 whereat they form the side walls of the flow-control chute segment 204 and permit fruits to traverse such chute segment freely. Since the chute segment 204 is disposed at a 30° angle and the rotary shafts 254, 256 are substantially vertical, it is obviously necessary that the angular disposition of each gate 250, 252 change during the described movement from closed to open disposition. To meet this requirement, each gate 250, 252 is pivoted about a horizontal pin 258, 260 extending through a slot in the shaft 254, 256 allowing the required change in the vertical angle of each gate as the same is rotated with its mounting shaft.

Preferably, as illustrated, the two gates 250, 252 overlap a considerable amount when in the illustrated closed disposition shown in FIG. 5 and accordingly, will remain in fruit blocking dispositions even when the two gates are moved 30° in either direction. Such adjustment of the disposition of the gates 250, 252 while retaining the same in fruit-blocking dispositions provides for volumetric adjustment of the storage space behind the gates in the upper end of the chute 200. If the fruits, for example, prunes, be of average size, the gates 250, 252 are adjusted to the closed disposition illustrated in full lines in FIG. 5; if larger fruits are being handled, the closed disposition of the gates is at a downward inclination of 30° to thus provide more volume in the temporary storage space existent behind the gates and thus provide, upon subsequent opening of the gates, delivery of a full complement of fruits into tray-covering relationship. If, on the other hand, small fruits are being handled, the closed disposition of the gates is reset at an angle approximately 30° upwardly from the illustrated full-line diposition in FIG. 5 to thus define a smaller volume for such small fruits which will again ultimately provide for delivery, upon opening of the gates, of a full complement of the small fruits onto the receiving tray 20.

Figure 7:
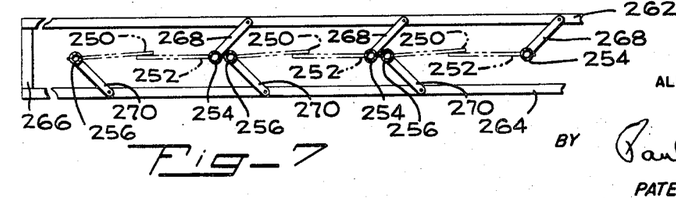
FIG. 7 is an enlarged fragmentary horizontal sectional view taken along line 7—7 of FIG. 2.

The gates 250, 252 are moved between one of the preestablished closed dispositions and their opened dispositions along the sides of the flow-control chute segments 204 by any suitable means for rotating the gate-mounting shafts 254, 256. Preferably, as illustrated in FIG. 7, such actuating means takes the form of a pair of horizontal rods 262, 264 which are both connected at their extremities to the lower end of an operating lever 266 (FIG. 3) mounted on the side of the frame about a central horizontal pivot so that manual pulling on the upper end of the lever effects simultaneous axial motion of both rods in the same direction. Three crank arms 268 are pivotally connected to one of the rods 262 at spaced intervals and are rigidly secured at their opposite ends to three of the rotary shafts 254 located at the right of the chute segments 204 relative to the direction of fruit travel therethrough. The second rod 264 extends in parallelism to the first rod 262 but on the opposite side of the rotary shafts 254, 256 and is similarly connected by three crank arms 270 to the three rotary shafts 256 to the left of the chute segments 204. Accordingly, when the operating lever 266 is moved, three of the rotary shafts 254 are turned in one direction while the other three shafts 256 are turned in the opposite direction and, as a consequence, all of the gates 250, 252 are moved simultaneously from their opened dispositions to closed dispositions or vice versa depending upon the pushing or pulling of the operating lever 266 by the attendant. Suitable indicia (not shown) can be placed adjacent the operating lever 266 to indicate when the desired opened or closed dispositions of the gates 250, 252 are achieved.

When fruits or other articles are released by opening of the described gates 250, 252, they flow through the remainder of the intermediate flow-control chute segments 204 and thereafter over the adjacent discharge segments 206 onto appropriately positioned fruit-receiving trays 20. Each of the discharge segments 206 is of course aligned with the adjacent flow-control segment 204 and is formed with a flat bottom and upstanding side walls so as to have a shallow, U-shaped transverse cross-section. Adjacent its uper end, small pins 280, project laterally from the side walls of the discharge chute segment for rotatable support in brackets 281 mounted on vertical struts 282 connected at their upper and lower extremities to additional transverse frame members 283, 284. Accordingly, each discharge chute segment 206 is pivoted at its upper end so that its lower end which is disposed adjacent a section in fruit-receiving position is free to move when the trays 20 are vibrated in the manner previously described.

The discharge chute segment 206, includes, at its lower extremity, an apron 285 supported to facilitate transfer of fruits onto the trays and, more particularly, to avoid "bridging" of the fruits as they move through the relatively small opening between the thin ribs 31 of the stacked trays. This apron 285 includes a plate 286 forming an extension of the discharge segment 206, the lateral extremities of the plate being bent upwardly and inwardly as shown at 286a in FIG. 6A so as to slidingly encompass fingers 287 projecting forwardly from the lower extremity of the segment 206 at both sides thereof. A sub-plate 288 is secured under the plate 286 and, when resting on the rib 31 of a tray, holds the plate 286 at an inclination of approximately 5°, as clearly shown in FIG. 6. Accordingly fruits passing over the apron 285 are not subjected to the flat top of the ribs 31 and their transfer is facilitated.

The upper end of the plate 286 which underlies the lower extremity of the segment 206 is bent upwardly as shown at 286b in FIG. 6. As a consequence, the narrowest opening in the flow channel for the fruits is not between the superposed ribs 31 but is between the surface of the chute segment 206 and the bent portion 286b of the plate 286 thereabove, such restrictive space being indicated at S in FIG. 6. From such a position, the flow channel opens or diverges in the direction of flow.

To avoid bridging at this restricted space S, the apron 285 is arranged to move with the trays 20 when they are vibrated. For this purpose, the lower end of plate 286 is bent downwardly as shown at 286c in FIG. 6 so as to engage the inner edge of tray rib 31 and a rigid plate 289 projects down from the plate 286 so as to engage the outer edge of the rib. Accordingly, the apron 285 moves back and forth as the trays are vibrated, and specifically the bend 286b partakes of this motion while the underlying chute segment 206 does not. The relative motions destroy any "bridging" effect of the fruits and further transfer onto the trays is facilitated since the flow channel diverges from this point, as previously mentioned.

To assure initial establishment of proper relationship between the discharge chute segment 206, its apron 285, and the adjacent tray 20, means are provided to temporarily lift the free end of the chute segment during that period when a cart 22 and a stack of trays 20 thereon are being moved into clamped disposition for the subsequent reception of fruits. Preferably, such means takes the form of a pair of actuating cables 300, 302 suspended adjacent the side walls of each discharge chute segment 206 relatively close to the lower end thereof. Each cable 300, 302 carries a plurality of beads at spaced intervals therealong which are arranged to engage an encompassing bracket 306 mounted to the side wall of the chute segment 206 wherefore, upon vertical lifting of the cable, all of the superposed chute segments are pivoted upwardly to facilitate entrance of the lower extremity of each chute segment 206 and the apron 285 extending therefrom into the space between superposed trays 20 as the latter are moved into fruit-receiving position by the previously described clamping members. Each cable 300, 302 is connected at its upper end to a hook 308 supported rigidly from a rotary shaft 312 extending transversely relative to the fruit delivery chutes 200 and supported in suitable bearings on the described upper frame members 74. The extremity of this shaft 312 is keyed to a manual actuating lever 314 which an attendant may grasp and pull to effect the desired lifting of the discharge chute segments 206 as the trays 20 are brought into fruit-receiving dispositions. After such tray disposition has been attained, the lever 314 is released and the aprons 285 extending from the lower ends of the discharge chute segments drop into positions of rest on the adjoining ribs 31 of the fruit-receiving tray 20, as shown in FIG. 6.

When the trays 20 are subsequently vibrated in the manner described hereinbefore, the discharge segments 206, including the aprons 285 pivot about the supporting pins 280, 282 to accommodate the tray movement and the aprons 285 themselves move to and fro to facilitate the transfer of fruits.

In order to facilitate the transfer of fruits from the chutes onto the trays and eliminate the need for the described apron 285, the trays may have the novel configuration, shown in FIG. 1B and previously described, and the lower extremity of the discharge chute segments 206' can be slightly modified for cooperative relationship with the modified tray 20' as illustrated in FIG. 6A. As shown in both FIGS. 1B and 6A, the thin ribs 31' at the edge of the modified tray 20' are tapered inwardly and this tapered surface is engaged by stub fingers 296', which project from the lower extremities of the discharge chute segment 206', these fingers lying in the same inclined plane as defined by the chute segment itself. It will then be obvious that the fruits remain on an inclined surface until they arrive on the thin fruit-supporting slats 29'. It has been determined experimentally that this modified arrangement is particularly effective in transfer of large fruits from the discharge chute segments onto the respective trays. Furthermore, the position of maximum restriction of fruit flow is between a rib 31' and the chute surface so that bridging is avoided.

Figures 8, 9:
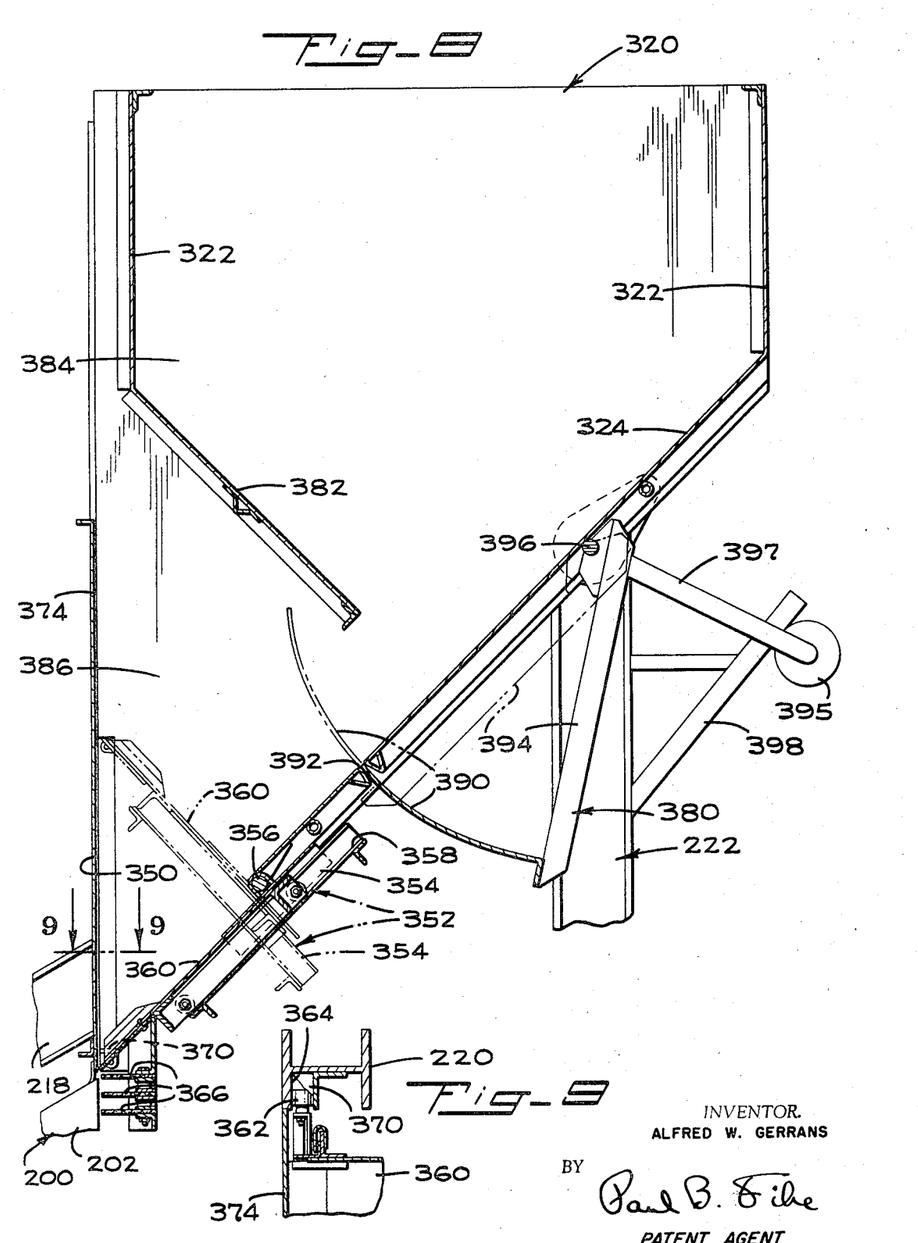
FIG. 8 is an enlarged vertical sectional view through the fruit hopper shown in side elevation in FIG. 2.
FIG. 9 is an enlarged fragmentary sectional view taken along line 9—9 of FIG. 8.

As previously mentioned, the feed chutes 200, and more particularly the initial vibratory chute segments 202 at the entrance end thereof, are supplied with fruits from a hopper 320 whose construction and operation can be visualized by reference to FIGS. 2, 8 and 9. The hopper 320 is relatively large, being composed of vertical sidewalls 322 and a bottom 324 that is downwardly inclined toward the adjacent feed chutes 200 wherefor fruits delivered to the open top of the hopper are moved by gravity along the sloping bottom 324 toward the chutes. The entire hopper 320 is movably supported from an upright, open rectangular rigid frame 222 for movement both downwardly and upwardly adjacent the entrance ends of the fruit delivery chutes 200. For such movement, one extremity of a flexible link chain 328 is connected to each side of the hopper 320 adjacent its upper end. Each chain 328 passes first upwardly and thence laterally over two idler sprockets 330, 332, and thereafter along a downward flight and around another idler sprocket 334 secured to the extremity of the piston rod of a hydraulic ram 336 at its lower end. After passing around the sprocket 334 on the hydraulic ram 336, the chain 328 includes a final vertical flight extending upwardly to the top of the frame whereat the chain is rigidly attached. If the ram 336 is fully retracted as shown in FIG. 2, the hopper 320 is raised to its uppermost position above the uppermost feed chute 200. In turn, as the hydraulic ram 336 is extended, the entire hopper 320 gradually moves downward to its lowermost position below the lowermost feed chute. To maintain the hopper 320 in appropriate feeding relationship with the chutes 200, a pair of guide rollers 340 on each side of the hopper 320 adjacent its upper and lower extremities are arranged to engage and move vertically between opposed guide rails 342, 344 rigidly attached to the hopper supporting frame 222.

As the hopper 320 moves downwardly through appropriate actuation of the hydraulic rams 336, the fruits therewithin are discharged through a discharge opening 350 in the lower portion of the hopper sidewall 322 adjacent the entrance ends of the feed chutes 200. Laterally, this opening is dimensionally equivalent to the three side-by-side feed chutes 200 and vertically is dimensioned substantially equivalent to the vertical heights of five of the superposed feed chutes 200 wherefore at any time during its downward motion, fruits flow from the hopper 320 simultaneously into five chutes, thus to expedite the chute loading operation. As the bottom of the hopper 320 moves adjacent the lowermost feed chute in its downward travel, the discharge opening 350 is closed by a pivoted gate 352 shown most clearly in FIG. 8. As there shown, this gate 352 includes a main body member 354 which is pivotally supported on a transverse shaft 356 rotatably supported on the sloping bottom 324 of the hopper adjacent its lower end and forming a slot 358 within which a plate 360 is slidably received. When the gate 352 is in its open disposition as shown in full lines in FIG. 8, the body member 354 carries the plate 360 in an extended disposition forming a continuation of the sloping bottom 324 of the hopper 320. The remote extremity of the plate 360 carries rollers 362 at opposite sides thereof which are encompassed within vertical U-channel members 364 supported from the hopper mounting frame 222 in a position such that the extremity of the opened gate 352 moves downwardly immediately adjacent the feed chutes to assure proper transfer of fruits from the hopper 320 into the feed chutes 200. To further insure proper transfer of the fruits from the hopper into the feed chutes, several flexible flaps 366 are mounted below the hopper 320 on a suitable bracket 368 to project toward the feed chutes 200 and maintain resilient engagement with the entrance ends thereof as the hopper moves either downwardly or upwardly.

In order to close the pivoted gate 352 when the lowermost feed chute has been passed by the lower end of the hopper 320, a stop 370 is rigidly mounted within the roller channel 364 to preclude further downward movement of the extremity of the pivoted gate. When such stop 370 is engaged by the roller 362 and downward hopper motion continues, the entire gate 352 starts to pivot in a clockwise direction from the full-line position shown in FIG. 8 towards the intermediate phantom-line position, the slidable plate 360 moving into the slot 358 during the initial half of the closing operation and thereafter again extending during the second half of gate closing movement until the final phantom-line closed position is attained. The gate 352 remains in this closed position during subsequent upward travel of the hopper 320, being frictionally held in such closed position by a conventional friction mechanism 372 attached to the extremity of the pivoted gate shaft 356. As the hopper 320 is returned to its uppermost position above the feed chutes 200 as illustrated in FIG. 2, another stop 370 in the roller guide channel 364 is engaged to positively open the gate as the uppermost position is attained, the opening action being substantially opposite to the previously described gate closing action. A side plate 374 on the frame precludes egress of fruits from the hopper 320 at this upper position.

The described hopper 320 also contains a second intermediate gate 380 which cooperatively functions with an intermediate partition 382 to divide the hopper into upper and lower compartments 384, 386. The mentioned partition 382 slopes inwardly from the sidewall 322 of the hopper 320, which lies adjacent the feed chutes 200, terminating in spaced relationship from the sloping bottom 324 of the hopper, thus to provide for flow of fruits from the upper compartment 384 into the lower compartment 386 when the secondary gate 380 is opened as shown in full lines in FIG. 8. This secondary gate 380 constitutes an arcuate plate 390 arranged to project through a transverse slot 392 in the bottom 324 of the hopper immediately above the pivoted gate 352 and mounted at the extremity of arms 394 pivoted on a shaft 396 rotatably mounted on the under surface of the hopper bottom. When the secondary gate 380 is in its closed position as shown in phantom lines in FIG. 8, the upper extremity of the arcuate plate 390 is above the level of the lower extremity of the angular partition 382, thus to effectively preclude the flow of fruits from the upper compartment 384 into the lower compartment 386 of the hopper. On the other hand, when the gate 380 is moved from its closed phantom line disposition to the open full line disposition, the extremity of the arcuate plate 390 is withdrawn through the transverse slot 392 to permit free flow of fruits from the upper compartment into the lower compartment of the hopper. Movement of the secondary gate 380 between its opened and closed dispositions is achieved through engagement of a roller 395 at the extremity of a lever 397 secured to the gate-mounting arms 394 with suitable stops 398, 400 mounted on the hopper mounting frame 326 adjacent its upper and lower extremities. The lower stop 400 is at a position such that the secondary gate 380 is moved in a clockwise direction from its opened to its closed disposition before the hopper 320 reaches its lowermost position. Preferably, the lower stop 400 is positioned to engage the roller 394 and close the secondary gate 380 when the hopper 320 has discharged fruit into all of the feed chutes 200 except the lowermost ten. Thereafter, no further delivery of fruits from the upper compartment 384 into the lower compartment 386 is possible and the remaining supply of fruits in the lower compartment of the hopper is sufficient to fill the lowermost chutes 200 leaving, upon closure of the pivoted gate 352, substantially no fruits in the lower compartment. In turn, as the hopper 320 moves upwardly, the stop 398 adjacent the upper end of the hopper mounting frame 326 is engaged by the roller 395 to urge the gate 380 in a counter-clockwise direction and effect, upon continued upward movement of the hopper, opening of the secondary gate 380 from the phantom line to the full line disposition shown in FIG. 8. Thus, fruits can flow from the upper compartment 384 into the lower compartment 386 preparatory to a subsequent downward feeding operation. Sufficient frictional forces exist in the secondary gate structure so that it will be maintained in its opened or closed disposition without an additional frictional mechanism as utilized in connection with the pivoted gate 352. It is to be particularly observed that this secondary gate 380, and more particularly the arcuate plate 390, moves in a direction lateral to the flow of fruits from the upper compartment 384 to the lower compartment 386 and very little resistance to its closing action is presented and since the delivery of fruits from the upper compartment is stopped prior to closure of the pivoted gate 352, very little resistance to closure of the latter is experienced since a relatively small quantity of fruits remain on the pivoted gate 352 during its closure.

If it is assumed that a plurality of carts 22 with empty trays 20 thereon are positioned on the input track 40 and the described hopper 320 has been supplied with prunes or other fruits in any suitable fashion, the operational sequence of the mechanism is substantially as follows. An individual cart 22 from the input track 40 is moved onto the first set of stub tracks 42 positioned as shown in FIG. 3. The hydraulic ram 60 is then extended so as to move the first cart 22 from the entrance station A to the loading station B. Upon arrival at the loading station B, the clamping members 90 are energized by the operator to displace the cart 22 and the empty trays 20 thereon onto the adjacent vibratory frame 80, the sides and the top of the trays 20 being clamped so that the entire structure becomes an integral part of the vibratory frame.

In accordance with an important aspect of the present invention, during such motion of the cart 22 and the trays 20 thereon into loading position, the hopper 320 has been moving downwardly to sequentially deliver fruits to the feed chutes 200 which are temporarily blocked by closure of the pivoted gates 250, 252 in the central control chute segments 204, the setting of such gates being made in accordance with the size of the prunes or other fruits being handled. After the hopper 320 has completed its downward travel and all of the feed chutes 200 are filled with a metered amount of fruits, vibration of the cart 22 and trays 20 thereon is instigated and the feed chute gates 250, 252 are opened so that fruits from all of the chutes are simultaneously delivered to all of the trays, thus to expedite the entire tray-loading operation.

During such loading operation, the hopper 320 is quickly returned to its uppermost disposition and more fruits are delivered thereto if requisite and, at the same time, the first set of stub tracks 42 is returned to the entrance station A, and a second cart 22 with empty trays 20 thereon is delivered thereto. Consequently, when the first tray stack has been loaded and the cart has been returned by actuation of the return rams 112 to move back onto the second set of stub tracks 46, the hydraulic ram 60 may be extended to simultaneously move the loaded trays to the exit station C and the empty trays to the loading station B thus to effect further expedition of the loading operation. An entire loading cycle time of 25 seconds is obtainable thus to substantially triple production rates achievable with mechanisms of the prior art as mentioned hereinbefore.

Obviously, various modifications and/or alterations in both the method and the apparatus as described herein can be made without departing from the spirit of the invention and the foregoing description of a particular arrangement is to be considered purely as exemplary and not in a limiting sense. The actual scope of the invention is indicated only by reference to the appended claims.

What is claimed is:

1. The method of loading fruits or other articles onto a group of stacked trays which comprises the steps of:
   delivering the fruits simultaneously to each of the trays at one edge thereof, and
   vibrating the entire stack of trays so that the fruits are moved across each tray into a single compact layer thereon.

2. The method of loading fruits according to claim 1 which comprises the additional step of:
   dividing fruits from a single source to flow through a plurality of like delivery channels to the trays.

3. The method of loading fruits according to claim 2 which comprises:
   vibrating the fruits during flow through the delivery channels.

4. The method of loading fruits according to claim 2 which comprises:
   supplying fruits sequentially to the delivery channels for divided flow to the trays.

5. The method of loading fruits according to claim 4, which comprises the additional step of:
   blocking the flow of fruits through the delivery channels until fruits have been supplied to all of such channels.

6. The method of loading fruits or other articles onto a group of stacked trays which comprises the steps of:
   moving a stack of trays from an entrance station to a loading station, vibrating the entire stack of trays at the loading station, delivering fruits onto each of the trays in the vibrating stack to load the same with fruits, and then
   moving the loaded stack of trays to an exit station simultaneously with movement of an empty stack from the entrance station to the loading station.

7. The method of loading fruits according to claim 6, which comprises the additional step of:
   clamping the stack of trays at the loading station prior to vibration thereof.

8. The method of loading fruits according to claim 6, which comprises the additional steps of:
   supplying fruits to delivery channels associated with respective trays of a stack while an empty stack is being moved to the loading station, and
   releasing fruits for delivery to the trays after vibration thereof has been instigated.

9. The method of loading fruits according to claim 6, wherein:
   the stack of trays is moved between the stations on a cart and the entire stack together with the cart is vibrated during the loading operation.

10. The method of loading fruits of other articles into a tray which comprises the steps of:
    guiding the fruits through a predetermined delivery channel, temporarily blocking fruit flow,
    moving a tray into fruit-receiving position at the exit of such delivery channel while the fruit flow is blocked, vibrating the tray in fruit-receiving position, and then releasing the fruits for traverse of the delivery channel into the vibrating tray whereby fruits are spread into substantially a single layer on the tray.

11. The method of loading fruits according to claim 10 which comprises the additional step of:
supplying fruits to the delivery channel while flow therethrough is blocked.

12. The method of loading fruits according to claim 10 which comprises the additional step of:
vibrating the fruits in the delivery channel to expedite traverse thereof.

13. The method of loading fruits or other articles onto a group of stacked trays which comprises the steps of:
moving a stack of trays from an entrance station to a loading station, simultaneously delivering fruits onto each of the trays in the stack at the loading station, and then
moving the loaded stack of trays to an exit station simultaneously with movement of an empty stack of trays from the entrance station to the loading station.

14. The method of loading fruits or other articles onto a group of stacked trays according to claim 13 which comprises the additional step of:
distributing the fruits delivered to each of the trays into a single layer thereover.

15. Apparatus for loading fruits or the like onto trays stacked on a cart which comprises:
a first set of stub tracks arranged to receive the cart at an entrance station,
means supporting said first set of stub tracks for movement from the entrance station to a loading station,
a second set of stub tracks on said supporting means in spaced relation to said first set of stub tracks so as to move from the loading station to an exit station simultaneously with movement of said first set of stub tracks from the entrance station to the loading station, and
means for loading fruits onto all of the trays on the cart at the loading station.

16. Apparatus for loading fruits or the like onto trays stacked on a cart according to claim 15 which comprises:
a third set of stub tracks at the loading station arranged to receive a cart and the trays thereon from one set of said movably supported stub tracks,
a pivotally suspended vibratory frame supporting said third set of stub tracks,
means for rigidly clamping a cart and trays thereon to said vibratory frame, and
means operative to effect vibration of said frame together with the cart and the trays thereon
wherefore fruits delivered to one edge of the stacked trays are distributed thereacross in a single layer.

17. Apparatus for loading fruits or the like onto trays stacked on a cart according to claim 16 which comprises:
means for moving said second set of stub tracks adjacent said third set of stub tracks during vibration of said vibratory frame, and means for releasing clamped engagement of the cart and the loaded trays with said vibratory frame, and
means for returning the cart with the loaded trays thereon onto said second set of stub tracks.

18. Apparatus for loading fruits or the like onto trays stacked on a cart according to claim 16 which comprises:
a plurality of feed chutes arranged to deliver fruits onto the trays clamped to said vibratory frame,
gate means in each of said chutes movable between fruit-blocking and fruit-dispensing dispositions, and
means for supplying fruits to said chutes.

19. Apparatus for loading fruits or the like onto trays stacked on a cart which comprises:
a pivotally-suspended vibratory frame arranged to receive a cart and the trays thereon,
means for moving the cart and trays onto said vibratory frame and for establishing clamped engagement therewith,
means for rapidly moving said vibratory frame on its pivotal suspension in a manner effective to move fruits or the like across the trays in a single layer, and
means for simultaneously delivering fruits to each of the trays during vibration thereof.

20. Apparatus for loading fruits or the like onto trays stacked on a cart according to claim 19 wherein:
said means for establishing clamped engagement includes:
members supported from said vibratory frame and arranged to engage two sides and the top of the stack of trays on the cart.

21. Apparatus for loading fruits or the like onto trays stacked on a cart according to claim 19 wherein:
said means for moving said vibratory frame includes:
actuating arms connected to said vibratory frame adjacent the upper and lower ends thereof,
shafts supported for rotation adjacent the upper and lower ends of said vibratory frame,
eccentric mechanisms on each of said shafts and connected respectively to each of said actuating arms to effect substantially longitudinal reciprocation of said actuating arms upon rotation of said shafts,
a common drive means connected to both of said shafts to effect simultaneous rotation thereof, and
means connecting one of said shafts to said drive means for effecting rotary adjustment of said shaft relative to said drive means,
whereby relative adjustment of the instantaneous rotary disposition of said shafts can be made.

22. Apparatus for loading fruits and the like onto trays stacked on a cart according to claim 21 wherein said means for adjustably connecting said one shaft to said drive means includes:
an endless flexible drive member connecting said drive means and said shaft,
a pair of idler pulleys arranged to contact opposed flights of said flexible member, and
means for adjusting the disposition of the said idler members in a direction transverse to the direction established by the flights of said flexible member.

23. Apparatus for adjusting the relative rotary dispositions of two shafts which comprises:
a single drive means,
means directly connecting said drive means to one of the shafts to effect rotation thereof,
means including an endless flexible member connecting said drive means to the other shaft to effect rotation thereof, whereby two flights of said member extend between said drive means and such shaft,
a pair of pulleys engaging the flights of said endless member, and
means mounting said pulleys for adjustment in a direction transverse to the direction defined by the flights of said endless member.

24. Apparatus for loading fruits or the like onto trays stacked on a cart which comprises:
a plurality of fruit-delivery chutes arranged in superposed relationship with their discharge ends adjacent the stacked trays,
the vertical spacing between said superposed chutes corresponding to the vertical spacing between the stacked trays and
means for supplying fruits or the like to the entrance ends of said chutes whereby fruits are conducted therethrough onto the adjacent trays,
each of said chutes being inclined downwardly from its entrance end to its discharge end, each of said chutes including a segment adjacent its discharge end mounted for pivotal motion about a transverse substantially horizontal axis so that the free remote end of said chute adjacent a receiving tray is arcuately movable about the pivotal axis.

25. Apparatus for loading fruits or the like onto trays stacked on a cart according to claim 24 which comprises:
means operative to move the pivoted discharge end of each of said chutes about its pivot.

26. Apparatus for loading fruits or the like onto trays stacked on a cart which comprises:
a plurality of fruit-delivery chutes arranged in superposed relationship with their discharge ends adjacent the stacked trays,
the vertical spacing between said superposed chutes corresponding to the vertical spacing between the stacked trays and
means for supplying fruits or the like to the entrance ends of said chutes whereby fruits are conducted therethrough onto the adjacent trays,
each of said chutes being inclined downwardly from its entrance end to its discharge end,
a hopper arranged to move sequentially across the entrance ends of said chutes and arranged to deliver the fruits thereinto.

27. Apparatus for loading fruits or the like onto trays stacked on a cart according to claim 26 which comprises:
gate means in said hopper for controlling the discharge of fruits therefrom into said chutes.

28. Apparatus for loading fruits or the like onto trays stacked on a cart which comprises:
a pivotally suspended vibratory frame arranged to receive a cart and the trays thereon,
means for moving the cart and trays onto said vibratory frame and for establishing clamped engagement therewith,
means for rapidly moving said vibratory frame on its pivotal suspension in a manner effective to move fruits or the like across the trays in a single layer,
a plurality of fruit delivery chutes arranged in an inclined and superposed relationship, the vertical spacing therebetween being equivalent to the vertical spacing of the stacked trays,
each chute including a discharge segment pivotally supported about a substantially horizontal axis spaced from the extremity of the chute, the free end of said segment adapted to rest on the adjacent tray, and
means for raising the discharge segment of each chute whereby the free pivoted end of the discharge segment can enter between superposed trays as the latter are moved onto said vibratory frame.

29. Apparatus for loading fruits or the like onto trays stacked on a cart according to claim 28 wherein:
said discharge segment includes an apron slidably mounted at its terminal end and arranged to engage an adjacent tray so as to move to and fro therewith.

30. Apparatus for loading fruits or the like into a multiplicity of single layers in superposed relationship which comprises:

a plurality of trays arranged in stacked relationship, each tray consisting of a plurality of thin slats joined by relatively thick longitudinal ribs and relatively thins ribs in transverse relationship thereto at opposed edges of the tray wherefore said relatively thin ribs are in spaced relationship when the trays are stacked,
each of the relatively thin ribs having an angular declining surface extending from the outer edge thereof, and
means for feeding fruits or the like onto the edge of each tray including an inclined chute having a discharge segment pivoted about a substantially horizontal axis spaced from the discharge extremity of the chute, and
fingers projecting from the extremity of the discharge chute segment in substantially coplanar relationship therewith and adapted to rest on the declining surface of said tray ribs.

31. Apparatus for loading fruits or the like onto a plurality of stacked trays which comprises:
a plurality of fruit-delivery chutes arranged in superposed relationship having:
vertical spacings therebetween equivalent to the vertical spacings of the stacked trays,
said trays being adapted for disposition adjacent the discharge ends of said chutes,
a gate in each of said chutes for controlling the flow of fruits therethrough, and
means for supplying fruits to the entrance ends of said chutes including:
a hopper movable adjacent the entrance ends of said chutes and having an exit opening through which fruits may flow into said chutes,
a pivoted gate movable into exit-closing disposition in said hopper,
means for automatically closing said gate upon movement of said hopper downwardly beyond the lowermost chute, and
means including a secondary gate within said hopper for dividing the hopper into upper lower compartments, and
means for closing said secondary gate before the exit opening of said hopper passes the lowermost chute.

References Cited

UNITED STATES PATENTS

| | | | |
|---|---|---|---|
| 1,152,997 | 9/1915 | Wild | 53—152 X |
| 1,253,997 | 1/1918 | Whitehurst et al. | 53—152 |
| 2,236,890 | 4/1941 | Bower et al. | 53—126 |
| 2,918,772 | 12/1959 | Bell et al. | 53—388 X |
| 3,107,800 | 10/1963 | Gerrans | 214—306 |

TRAVIS S. McGEHEE, *Primary Examiner.*

R. L. SPRUILL, *Assistant Examiner.*

U.S. Cl. X.R.

53—152, 250